United States Patent

Liehrr et al.

[11] Patent Number: 5,976,683
[45] Date of Patent: Nov. 2, 1999

[54] COATING SYSTEM TRANSPARENT TO LIGHT AND REFLECTING THERMAL RADIATION

[75] Inventors: Michael Liehrr, Feldatal; Hans-Georg Lotz, Gründau, both of Germany

[73] Assignee: Leybold Systems GmbH, Hanau, Germany

[21] Appl. No.: 08/955,964

[22] Filed: Oct. 22, 1997

[30] Foreign Application Priority Data

Oct. 24, 1996 [DE] Germany .................... 196 43 550

[51] Int. Cl.$^6$ .................................................. B32B 17/06
[52] U.S. Cl. ...................... 428/216; 428/212; 428/426; 428/432; 428/408; 428/698; 428/704; 257/77
[58] Field of Search .................... 428/408, 704, 428/212, 432, 216, 426, 698; 257/77

[56] References Cited

U.S. PATENT DOCUMENTS

| | | |
|---|---|---|
| 4,450,201 | 5/1984 | Brill et al. . |
| 4,532,181 | 7/1985 | Brill et al. . |
| 4,939,043 | 7/1990 | Birick et al. ................ 428/620 |
| 5,138,808 | 8/1992 | Kimock et al. ............ 428/408 |
| 5,254,862 | 10/1993 | Kalyankjumar et al. ........ 257/77 |
| 5,362,975 | 11/1994 | Von Windheim et al. ....... 257/77 |
| 5,432,357 | 7/1995 | Kato et al. ................. 257/77 |
| 5,506,422 | 4/1996 | Dreifus et al. ............. 257/77 |
| 5,670,796 | 9/1997 | Nishibayashi et al. ........ 257/77 |

FOREIGN PATENT DOCUMENTS

| | | |
|---|---|---|
| 0 320 657 | 12/1987 | European Pat. Off. . |
| 0284190 | 9/1988 | European Pat. Off. . |
| 0464701 | 1/1992 | European Pat. Off. . |
| 0714999 | 6/1996 | European Pat. Off. . |
| 3039821 | 6/1982 | Germany . |
| 3140100 | 11/1986 | Germany . |
| 3807600 | 9/1989 | Germany . |
| 4211363 | 10/1993 | Germany . |
| 2228949 | 9/1990 | United Kingdom . |

OTHER PUBLICATIONS

English abstract of Jp 61–251158.
DIALOG: DERWENT WPI record with Abstract (in English) of EP 0 464 701.
DIALOG: DERWENT WPI record with Abstract (in English) of DE 42 11 363 A.
DIALOG: DERWENT WPI record with Abstract (in English) of DE 30 39 821.
DIALOG: DERWENT WPI record with Abstract (in English) of DE 38 07 600.
DIALOG: DERWENT WPI record with Abstract (in English) of DE 31 40 100.

*Primary Examiner*—Archene Turner

[57] ABSTRACT

A system for coating a substrate with a thin film which has a high transmissivity in the visible spectrum and a high reflectivity in the thermal radiation spectrum. The film coating has at least one carbon layer crystallized with a diamond structure and doped with foreign atoms, the carbon layer being electrically conductive depending upon the doping concentration cA of the foreign atoms and having low radiation emissivity in the thermal radiation spectrum.

17 Claims, 1 Drawing Sheet

COATING SYSTEM TRANSPARENT TO LIGHT AND REFLECTING THERMAL RADIATION

FIELD OF INVENTION

The invention relates to a system of coatings which has a high transmission in the visible light spectrum and a high reflectivity in the thermal radiation spectrum.

BACKGROUND OF THE INVENTION

Generic coating systems are generally called "low e" (low emissivity) systems. Such coating systems, which are applied for example to flat glass, serve to admit light in the visible spectrum but reflect longer-wavelength thermal radiation. When such flat glass is used in window glazing, it makes an advantageous contribution toward minimizing radiant heat loss from a room through glass windows.

Conventional low-e systems consist basically of the following succession of coatings: substrate/metal oxide/metal/metal oxide.

Such a low-e coating system is described, for example, in German Patent 42 11 363. The actual functional coating is the metal layer which consists of metals with a very low coefficient of radiation emission. Usually the metal coating consists of silver, gold or also copper, and alloys of these metals. The metal oxide layers serve as anti-reflective coatings and at the same time they serve to protect the metal coating against mechanical and/or chemical environmental action. Also provided are multi-layer protective coatings which increase resistance to environmental influences in generic low-e coating systems.

On account of the increasingly stringent requirements as regards the optical and energy parameters of low-e coating systems and their required resistance to environmental influences, it has been found that conventional coating systems no longer satisfy these requirements. Resistive coatings consisting of indium-tin-oxide (ITO) are known, which have emissivities between 0.15 and 0.13. One disadvantage of the use of low-e coating systems using such ITO coatings is that large-scale architectural glass applications are very expensive due to the extremely high material cost of indium. As an alternative, low-e coatings made from tin oxide are used, which for reasons of cost are applied to the support material pyrolytically and have an emissivity of 0.4.

The invention is addressed to the problem of creating a low-e coating system of the kind described above, which will have improved resistance to chemical and/or mechanical action and avoid the deficiencies of the known technical solutions.

SUMMARY OF THE INVENTION

This problem is solved according to the invention by a low-e coating system which contains at least one carbon coating crystallized with a diamond structure and doped with foreign atoms, the radiation emissivity in the thermal radiation spectrum and the electrical conductivity of this diamond coating being controllable through the concentration $c_A$ of the foreign atoms in the carbon coating. The doping material, according to claim 2, is a boron dopant, so that the diamond layer has p-conductivity. The use of doped diamond layers according to the invention for low-e coating systems has the decided advantage that such coatings combine a low emissivity in the infrared spectrum and high transparency in the visible spectrum, with the physical and chemical properties desired in such coating systems, namely great hardness, and high resistance to attrition, and also chemical stability against any environmental influences. The invention provides, to special advantage, a coating system which has low emissivities comparable to conventional low-e coating systems prepared on a basis of silver, yet avoids their poor stability against environmental influences. Low-e coating systems of the invention can thus be used advantageously, for example, on the exterior surfaces of glass windows. By this new possibility for the use of low-e coating systems, namely on exterior surfaces of glass windows a decided lowering of the so-called U value is achieved. The U value is understand to refer to the thermal conductivity of a boundary surface which has the unit $W/m^2K$ in SI units, with W=energy, $m^2$=surface area, K=temperature in Kelvin. The foreign atom concentration in the low-e diamond layer is, according to the invention, $10^{20}$ atoms/$cm^3$ and $10^{32}$ atoms/$cm^3$ (see claim 3). The electrical conductivity of the diamond layer can be controlled by the foreign atom concentration, it being proposed to select the sheet resistance $R\square$ of the diamond layer between 1 $\Omega/\square$ and 10 $\Omega/\square$ (ohms per square). See L. Maissel and R. Glang, *Handbook of Thin Film Technology*, pp. 13–5 to 13–7, herein incorporated by reference.

It is furthermore proposed to embed the doped diamond layer between two high-purity, undoped diamond layers, so that the low-e coating system will consist of a total of three layers disposed in succession on a substrate.

It is preferred to provide optical adaption of layers in the coated substrate of the invention, i.e. to provide intervening layers between, e.g., the substrate and the first carbon layer such that the optical transmission T between the layers has a high value which is substantially independent of the wavelength of light transmitted therethrough. For optical adaptation of the diamond layers to the substrate, on the one hand, and to the ambient medium on the other, a coating in direct contact with the substrate and one in direct contact with the uppermost diamond layer are provided, which are made from a metal oxide, preferably from at least one of the compounds zinc oxide, titanium dioxide, aluminum oxide, silicon dioxide or tin oxide, respectively. The total thickness d of a system of layers having at least three diamond layers, amounts to no more than 1.5 µm. The metal oxide layers provided as optical adaptation layers have thicknesses between 0.05 µm and 0.2 µm. Alternatively, it is proposed that the adaptation coatings and/or the layers directly adjacent the doped diamond coating be made from C-BN, i.e., cubic boron nitride.

It is proposed that the individual layers containing individual diamond coatings be made synthetically. For the production of a coating system according to the invention with at least one diamond layer as a low-e layer, a plasma-chemical deposition method is proposed, preferably a chemical vapor deposition method, i.e., CVD. In these kinds of deposition processes, diamond coatings are deposited on a substrate out of the gas phase with the addition of atomic hydrogen. By this method, compact, polycrystalline diamond coatings for deposition on substrates can be produced synthetically, which according to the invention are usable as low-e coatings.

Additional advantageous properties of preferred embodiments of the subject matter of the invention are stated in the subordinate claims related to the principal claim.

Two especially advantageous low-e coating systems according to the invention are explained below.

DETAILED DESCRIPTION OF THE INVENTION

Figure 1:
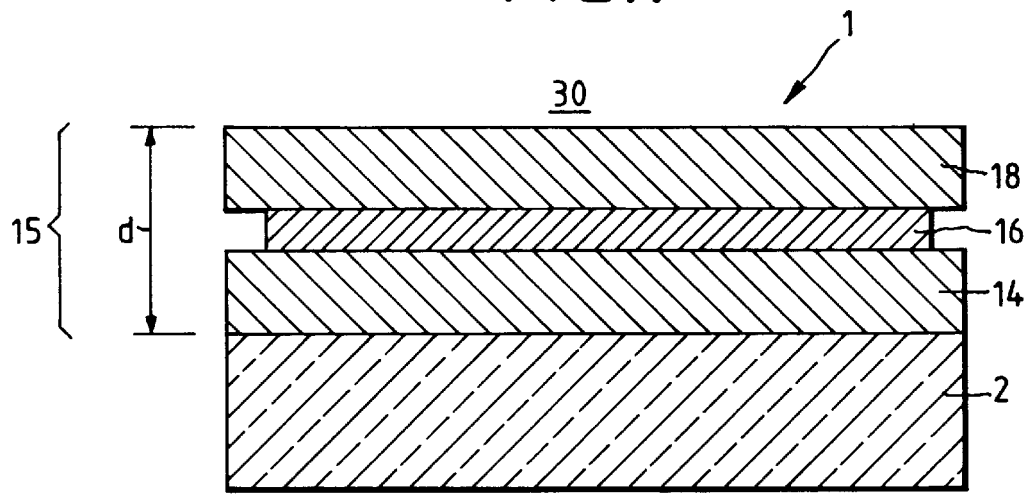
FIG. 1—shows a low-e coating system comprising three individual coatings applied to a substrate.

The low-e coating system represented in FIG. 1 consists of a total of three individual layers, namely:

- a first layer 14 lying on a substrate 2,
- a second, carbon layer applied to layer 14, doped with foreign atoms and acting as a low-e carbon coating which is crystallized in a diamond structure, and a protective coating 18 covering coating 16.

Layers 14 and 18 consist each of high-purity, preferably polycrystalline carbon layers crystallized in a diamond structure. Layers 14, 16, 18 are each deposited by a CVD process on the substrate 2. The substrate 2 consists of a transparent glass body, i.e., window glass.

Figure 2:
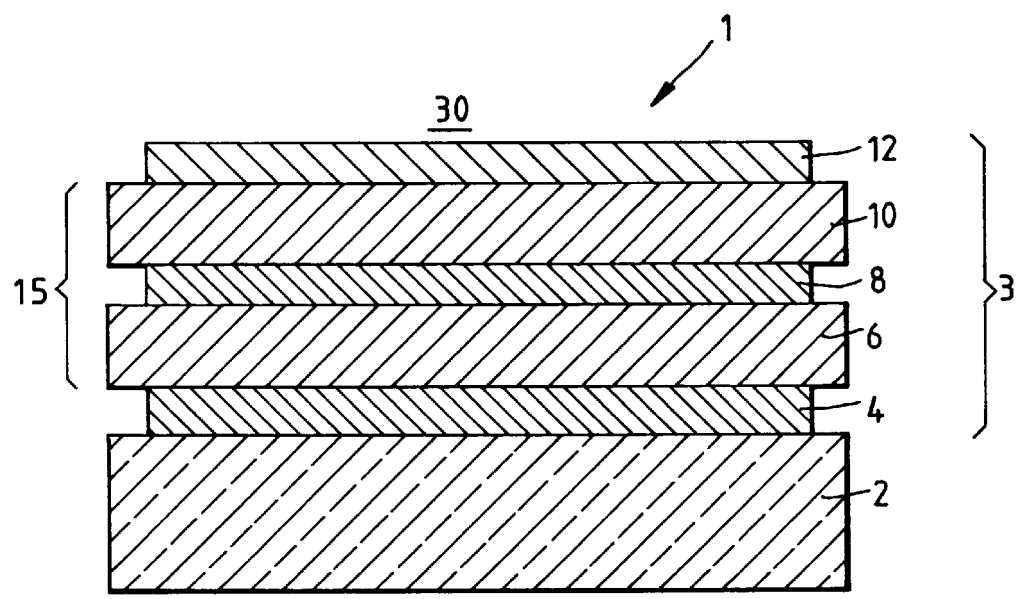
FIG. 2—is a low-e coating system consisting of five individual coatings on a substrate.

In the second embodiment represented in FIG. 2, the coating system 15 comprising the diamond layers 14, 16, 18 is embedded between two intermediate layers 4 and 12 acting as optical adaptation layers. The low-e coating system, as represented in FIG. 2, comprises a total of five individual layers, namely:

- a first layer 4 lying on the substrate 2,
- a second layer 6 consisting of diamond,
- a third carbon layer 8 having a diamond structure and doped with foreign atoms,
- a fourth, high-purity diamond layer 10 covering the carbon layer 8, and a fifth layer 12 between the coating system and the ambient medium.

The intermediate layers 4 and 12 provided as optical adaptation layers consist of metal oxide compounds, e.g., TiO2, Al2O3, SiO2, SnO2 or ZnO. The thicknesses of the adaptation layers 4 and 12 amount to between 0.05 $\mu$m and 0.2 $\mu$m. Coating system 16, consisting of the three successive layers 6, 8, 10 and 14, 16, 18, has an overall thickness of <1.5 $\mu$m.

The low-e coating systems represented in FIG. 1 and FIG. 2 can be used, for example, as an electrically conductive coating system for use in motor vehicle windshields, since the conductive coatings can be heated by ohmic resistance by the flow of electric current and serve for defrosting motor vehicle windows. Moreover, the coating systems represented can be used as transparent walls shielding against electromagnetic fields.

The low-e coating systems 15 and 3 represented in FIGS. 1 and 2 are provided for application to exterior surfaces of architectural glazing to be used, for example, in climate zones with particles acting abrasively on glass surfaces, such as winds bearing sand, for example, or which are exposed to high chemical and/or physical stress by intensive cleaning processes.

We claim:

1. An article with a transparent coating system having a high transmissivity in the visible spectrum and a high reflectivity in the thermal radiation spectrum, said article comprising:

a substrate and a transparent carbon layer on said substrate, said carbon layer being crystallized with a diamond structure and doped with boron, wherein said boron is present in said carbon layer in a doping concentration $c_A$ such that said carbon layer is electrically conductive and has low radiation emissivity in the thermal radiation spectrum, wherein the substrate is of transparent glass material.

2. The article according to claim 1, wherein the boron concentration $c_A$ is between $5 \times 10^{20}$ atoms/cm$^3$ and $5 \times 10^{21}$ atoms/cm$^3$.

3. The article according to claim 1, wherein the foreign boron $c_A$ of the doped diamond layer is chosen such that the electrical sheet resistance R☐ of the diamond layer is between 1 Ω/☐ and 10 Ω/☐.

4. The article according to claim 1, wherein the layer is produced by means of a plasma chemical depositing process.

5. An article with a transparent coating system having a high transmissivity in the visible spectrum and a high reflectivity in the thermal radiation spectrum, said article comprising:

a substrate;

a first layer of carbon deposited on the substrate, said first carbon layer having a diamond structure;

a second carbon layer doped with foreign atoms and crystallized in a diamond structure, said foreign atoms being present in said carbon layer in a doping concentration $c_A$ such that said carbon layer is electrically conductive and has low radiation emissivity in the thermal radiation spectrum, and a third layer of carbon covering the second layer, said third layer having a diamond structure, wherein said substrate is of transparent glass material.

6. The article according to claim 5, wherein the boron concentration $c_A$ of the doped diamond layer is chosen such that the electrical sheet resistance R☐ of the diamond layer is between 1 Ω/☐ and 10 Ω/☐.

7. The article according to claim 5, wherein the layer is produced by means of a plasma chemical depositing process.

8. An article with a transparent coating system having a high transmissivity in the visible spectrum and a high reflectivity in the thermal radiation spectrum, said article comprising:

a substrate;

a first layer comprising a metal oxide lying on the substrate;

a second layer consisting of carbon crystallized in diamond structure and applied to said first layer;

a third layer of carbon on said second layer, with third layer doped with boron and having diamond structure, wherein said boron is present in said carbon layer in a doping concentration $c_A$ such that said carbon layer is electrically conductive and has low radiation emissivity in the thermal radiation spectrum;

a fourth layer consisting of carbon and having diamond structure and;

an outer fifth layer comprising a metal oxide covering the fourth layer, the first layer and the outer fifth layer being of materials of a kind so as to provide an optical adaptation between the substrate and the second layer, and between the fourth layer and an ambient medium beyond the outer fifth layer.

9. The article according to claim 8, wherein the boron concentration $c_A$ is between $5 \times 10^{20}$ atoms/cm$^3$ and $5 \times 10^{21}$ atoms/cm$^3$.

10. The article according to claim 8, wherein the first layer and the fifth layer comprise at least one material selected from the group consisting of zinc oxide, titanium dioxide, aluminum oxide, silicon dioxide and tin oxide.

11. The article according to claim 10, wherein the coating layers which cause optical adaptation each have a thickness between 0.05 $\mu$m and 0.2 $\mu$m.

12. The article according to claim 8, wherein the boron concentration $c_A$ of the doped diamond layer is chosen such that the electrical sheet resistance $R\square$ of the diamond layer is between 1 $\Omega/\square$ and 10 $\Omega/\square$.

13. The article according to claim 8, wherein the first and fifth layers consist of cubic boron nitride.

14. The article according to claim 8, wherein the layer is produced by means of a plasma chemical depositing process.

15. The article according to claim 8, wherein the total thickness of said layers combined is less than or equal to 1.5 $\mu$m.

16. The article according to claim 8, wherein the substrate is of transparent glass material.

17. An article with a transparent coating system having a high transmissivity in the visible spectrum and a high reflectivity in the thermal radiation spectrum, said article comprising:

a substrate;

a first layer of carbon deposited on the substrate, said first carbon layer having a diamond structure;

a second carbon layer doped with foreign atoms and crystallized in a diamond structure, said foreign atoms being present in said carbon layer in a doping concentration $c_A$ such that said carbon layer is electrically conductive and has low radiation emissivity in the thermal radiation spectrum, and a third layer of carbon covering the second layer, said third layer having a diamond structure, wherein the first and third layers consist of cubic boron nitride.

* * * * *